US010587625B2

(12) United States Patent
Kludy

(10) Patent No.: US 10,587,625 B2
(45) Date of Patent: Mar. 10, 2020

(54) SEGREGATION OF PROTECTED RESOURCES FROM NETWORK FRONTEND

(71) Applicant: Citrix Systems, Inc., Fort Lauderdale, FL (US)

(72) Inventor: Thomas Michael Kludy, Cooper City, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 226 days.

(21) Appl. No.: 15/470,359

(22) Filed: Mar. 27, 2017

(65) Prior Publication Data

US 2018/0278620 A1    Sep. 27, 2018

(51) Int. Cl.
*H04L 29/06* (2006.01)
*G06F 21/10* (2013.01)
(Continued)

(52) U.S. Cl.
CPC .......... *H04L 63/105* (2013.01); *G06F 21/10* (2013.01); *G06F 21/6218* (2013.01); *H04L 63/126* (2013.01); *H04L 63/1441* (2013.01); *H04L 67/34* (2013.01); *G06F 8/61* (2013.01); *H04L 9/3247* (2013.01)

(58) Field of Classification Search
CPC . H04L 63/105; H04L 63/1441; H04L 9/3247; H04L 63/126; H04L 67/34; G06F 8/61; G06F 21/10; G06F 21/6218
See application file for complete search history.

(56) References Cited

U.S. PATENT DOCUMENTS

| 5,642,515 A * | 6/1997 | Jones | G06F 21/335 |
| | | | 709/227 |
| 8,914,632 B1 * | 12/2014 | Shankar | H04L 63/101 |
| | | | 713/167 |

(Continued)

OTHER PUBLICATIONS

Feijoo, et al., "Identity Management Connecting Principal Identities to Alias Identities Having Authorization Scopes," U.S. Appl. No. 15/482,904, filed Apr. 10, 2017.

(Continued)

*Primary Examiner* — Chau Le
*Assistant Examiner* — Han Yang
(74) *Attorney, Agent, or Firm* — BainwoodHuang

(57) ABSTRACT

A method of performing operations involving accessing a set of protected computing resources of a computing device includes (a) receiving, by a frontend service, an instruction via a network connection, the instruction directing the computing device to perform an operation involving accessing the set of protected resources, the set of protected computing resources being configured to refuse access to the frontend service, (b) in response to receiving the instruction, sending a request from the frontend service to a backend service, the request instructing the backend service to access the set of protected resources, the backend service being configured to not communicate via the network connection, the set of protected computing resources being configured to permit access to the backend service, and (c) in response to the backend service receiving the request from the frontend service, the backend service accessing the set of protected resources in fulfillment of the operation.

19 Claims, 2 Drawing Sheets

(51) Int. Cl.
    *G06F 21/62*     (2013.01)
    *H04L 29/08*     (2006.01)
    *H04L 9/32*     (2006.01)
    *G06F 8/61*     (2018.01)

(56) References Cited

U.S. PATENT DOCUMENTS

| | | |
|---|---|---|
| 9,203,904 B2 | 12/2015 | Maldaner |
| 9,244,700 B2 | 1/2016 | Gujarathi et al. |
| 9,471,331 B2 | 10/2016 | Kludy et al. |
| 9,703,581 B2 | 7/2017 | Duchastel et al. |
| 9,819,538 B2 | 11/2017 | Kludy et al. |
| 9,838,249 B2 | 12/2017 | Kludy et al. |
| 9,866,496 B2 | 1/2018 | Lawrence et al. |
| 9,906,461 B2 | 2/2018 | Kludy et al. |
| 2010/0131616 A1* | 5/2010 | Walter ............... H04L 63/0209 709/219 |
| 2011/0010759 A1* | 1/2011 | Adler .................. G06F 21/10 726/4 |
| 2011/0078675 A1* | 3/2011 | Van Camp ............ G06F 8/65 717/170 |
| 2013/0167200 A1* | 6/2013 | Birch ................... H04L 63/08 726/4 |
| 2013/0318152 A1* | 11/2013 | Iyer .................... G06F 9/541 709/203 |

OTHER PUBLICATIONS

Reyes, et al., "Increasing Capacity in a Topic-Subscription Messaging System," U.S. Appl. No. 15/454,486, filed Mar. 9, 2017.

\* cited by examiner

SEGREGATION OF PROTECTED RESOURCES FROM NETWORK FRONTEND

BACKGROUND

Cloud computing is often used to host client resources remotely for access on a client system. A client-side cloud computing service runs on a client machine to allow the client to access the remotely-hosted resources in the cloud. A server-side service runs remotely to interface with the client-side service on the client machine. The server-side service communicates with the client-side cloud computing service to cause the client to be able to properly interface with the remotely-hosted client resources.

On occasion, the server-side service may direct the client-side cloud computing service to carry out operations on resources local to the client machine. For example, the server-side service may direct the client-side cloud computing service to update its software to properly interface with the server-side service.

SUMMARY

One embodiment is directed to a method of performing operations involving accessing a set of protected computing resources of a computing device. The method includes (a) receiving, by a frontend service running on the computing device, an instruction via a network connection, the instruction directing the computing device to perform an operation involving accessing the set of protected resources of the computing device, the set of protected computing resources being configured to refuse access to the frontend service, (b) in response to receiving the instruction, sending a request from the frontend service running on the computing device to a backend service running on the computing device, the request instructing the backend service to access the set of protected resources of the computing device, the backend service being configured to not communicate via the network connection, the set of protected computing resources being configured to permit access to the backend service, and (c) in response to the backend service receiving the request from the frontend service, the backend service accessing the set of protected resources of the computing device in fulfillment of the operation. Other embodiments are directed to a computerized apparatus, system, and computer program products for performing methods similar to that described above.

BRIEF DESCRIPTION OF THE DRAWINGS

The foregoing and other objects, features and advantages will be apparent from the following description of particular embodiments as illustrated in the accompanying drawings in which like reference characters refer to the same parts throughout the different views. The drawings are not necessarily to scale, emphasis instead being placed upon illustrating the principles of various embodiments.

DETAILED DESCRIPTION

The above-described conventional systems may suffer from security-related deficiencies. For example, if a malicious user (e.g., a hacker) is able to compromise the client-side cloud computing service, the hacker may be able to maliciously direct the client-side cloud computing service to carry out operations on resources local to the client machine that are highly-privileged. For example, the hacker may be able to cause the client-side cloud computing service to install a malicious software update on the client machine. As another example the hacker may be able to cause the client-side cloud computing service to kill essential system processes running on the client machine, thereby causing havoc and requiring a restart or worse. However, it would not be effective to just deprive the client-side cloud computing service of the ability to access highly-privileged resources of the client machine, because the client-side cloud computing service does often need to access those resources.

Thus, it would be desirable to configure the client machine to be resistant to exposing its highly-privileged resources to the client-side cloud computing service in the event of malicious takeover, while still providing the client-side cloud computing service with access to those highly-privileged resources when necessary. This may be accomplished by dividing the client-side cloud computing service into separate frontend (network-facing) and backend (highly-privileged resources facing) services to provide resistance to hacking. Even if a hacker is able to compromise the frontend service over the network, the hacker will not be able to directly access the highly-privileged resources unless he is also able to compromise the security of the backend service. Security can be further enhanced by having both the frontend and backend services separately check the validity of commands directed at the highly-privileged resources and by utilizing access control mechanisms to prevent unauthorized access to various system components.

Figure 1:
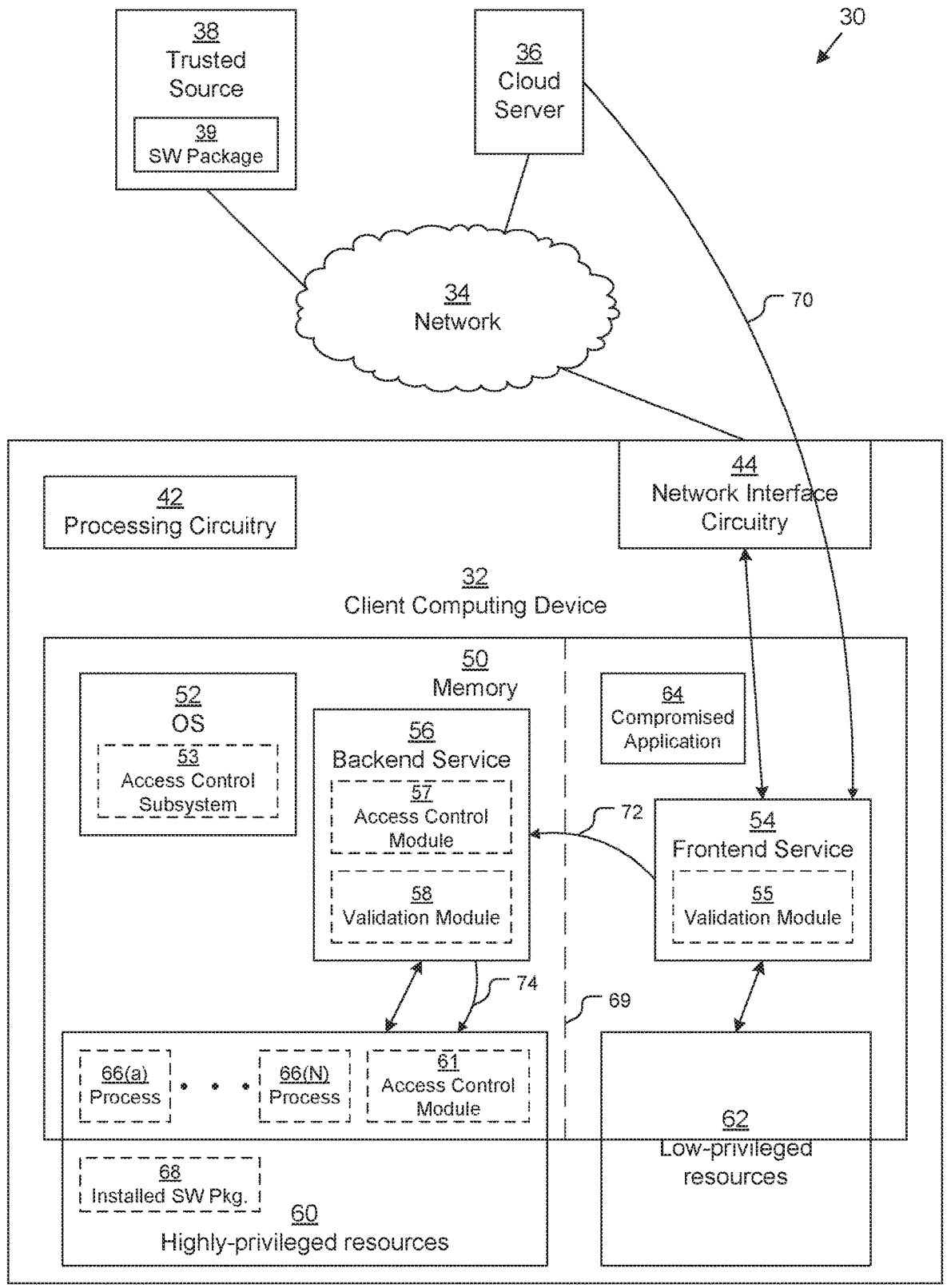
FIG. 1 depicts an example system and apparatus for use in performing various embodiments.

FIG. 1 depicts an example system 30. System 30 includes a client computing device 32 that connects over a network 34 to one or more cloud servers 36. In some embodiments, client computing device 32 also connects to a trusted source 38 via network 34.

Network 34 may be any kind of network, such as, for example, a local area network, a wide area network, the Internet, a fabric of interconnected hubs and switches, etc. In some embodiments, in lieu of a network, direct point-to-point connections may be used.

Cloud server 36 provides cloud-based services and access to cloud-hosted resources to the client computing device. Trusted source 38 is a computing device that is configured to offer one or more software packages 39 for download by client computing devices 32. Trusted source 38 may be configured to cryptographically sign software package 39. A recipient (e.g., client computing device 32) of the signed software package 39 may verify the signature with reference to a public key (not depicted) of the trusted source 38 as is well-known in the art.

Client computing device 32 includes processing circuitry 42, network interface circuitry 44, and memory 50. Processing circuitry 42 may include any kind of processor or set of processors able to perform operations, such as, for example, a microprocessor, a multi-core microprocessor, a digital signal processor, a collection of electronic circuits, or any combination of the above.

Network interface circuitry 44 interfaces with network 34. Network interface circuitry 44 may include an Ethernet adapter, a cellular modem, a Wireless Fidelity (WiFi) wireless networking adapter, a Bluetooth adapter, a Near Field Communication adapter, any other device for connecting to a network, or some combination thereof. Client computing device 32 communicates with cloud server 36 as well as trusted source 38 via network interface circuitry 44.

Memory 50 may be any kind of digital system memory, such as, for example, RAM. Memory 50 stores programs and applications executing on processing circuitry 42 as well as data used by those programs. Memory 50 stores an operating system (OS) 52 (e.g., Unix, Windows, MacOS, Android, IOS, etc.) as well as various other software modules (some of which may be independent applications, while others are parts of other applications or the operating system).

Memory 50 stores various software modules and constructs that run on processing circuitry 42 to effectuate functions of the client computing device 32. These software modules and constructs include a frontend service 54 and a backend service 56. Frontend service 54 communicates with cloud server 36 over network 34 via network interface circuitry 44 in order to provide a client user (not depicted) of the client computing device 32 with remote access to resources (not depicted) and services hosted by the cloud server 36. Frontend service 54 is able to access low-privileged resources 62 of the client computing device 32. Low-privileged resources 62 may include hardware resources (e.g., user interface circuitry) as well as software resources stored in memory 50. However, frontend service is not able to access highly-privileged resources 60 of the client computing device 32.

Highly-privileged resources 60 may include hardware resources (e.g., portions of disk drives) as well as software resources stored in memory 50 (e.g., system configuration databases, processes 66 executing within the kernel or protected memory space). Highly-privileged resources 60 are protected resources that require special permissions (e.g., root, superusuer, administrator, Local System, etc.) for access.

In some embodiments, frontend service 54 includes a validation module 55 that is configured to validate data associated with any instruction 70 from cloud server 36. The data subject to validation may also include data downloaded from trusted source 38. The validation tends to ensure that the instruction 70 has not been compromised or modified. For example, in the case of an instruction 70 to download and install software package 39 from trusted source 38 as installed software package 68 within highly-privileged resources 60, validation module 55 may validate that trusted source 38 is indeed trusted and that the software package 39 has been properly signed by the trusted source 38 with reference to a publicly-available key of the trusted source 38 as is well-known in the art. As another example, in the case of an instruction 70 to kill a process 66(a) running on the client computing devices 32 within its highly-privileged resources 60, validation module 55 may validate that the process 66(a) has to do with the cloud access and is owned by the frontend service 54 rather than another process 66(N) also running on the client computing devices 32 within its highly-privileged resources 60 but that is unrelated to the cloud service (e.g., part of the OS 52 kernel).

Backend service 56 is able to access the highly-privileged resources 60, but it is not able to access network interface circuitry 44. Thus, it is difficult for a hacker to compromise the backend service 56 since he cannot access it directly from the network 34.

In some embodiments, backend service 56 includes an access control module 57 that is configured to refuse access to any caller except frontend service 54. Thus, frontend service 54 is able to send a request 72 to access the highly-privileged resources 60 to backend service 56, but other applications are not able to do so. Thus, a compromised application 64 running on client computing device but compromised by a hacker is not able to send a request 72 to access the highly-privileged resources 60 to backend service 56. In some embodiments, instead of access control module 57 running within backend service 56 providing this functionality, an access control subsystem 53 of the OS 52 is configured to only permit applications with certain security identifiers (e.g., frontend service 54) to access the backend service 56.

In some embodiments, backend service 56 includes a validation module 58 that is configured to validate data associated with any request 72 from frontend service 54. The data subject to validation may also include data downloaded from trusted source 38. The validation tends to ensure that the request 72 has not been compromised or modified. For example, in the case of a request 72 to download and install software package 39 from trusted source 38 as installed software package 68 within highly-privileged resources 60, validation module 58 may validate that trusted source 38 is indeed trusted and that the software package 39 has been properly signed by the trusted source 38 with reference to a publicly-available key of the trusted source 38 as is well-known in the art. As another example, in the case of a request 72 to kill a process 66(a) running on the client computing devices 32 within its highly-privileged resources 60, validation module 58 may validate that the process 66(a) has to do with the cloud access and is owned by the frontend service 54 rather than another process 66(N) also running on the client computing devices 32 within its highly-privileged resources 60 but that is unrelated to the cloud service (e.g., part of the OS 52 kernel).

In some embodiments, highly-privileged resources 60 includes an access control module 61 that is configured to refuse access to any caller except backend service 56 or another caller have root, superuser, administrator, or Local System privileges (depending on the type of OS 52). Thus, backend service 56 is able to send an access operation 74 to access the highly-privileged resources 60 to, but other applications (e.g., frontend service 54, compromised application 64, etc.) are not able to do so. Thus, even if a hacker is able to compromise frontend service 54 or another compromised application 64, the hacker is not able to access the highly-privileged resources 60 unless the hacker is also able to compromise the backend service 56. In some embodiments, instead of access control module 61 running within highly-privileged resources 60 providing this functionality, access control subsystem 53 of the OS 52 is configured to only permit applications with root, superuser, administrator, or Local System privileges to access the highly-privileged resources 60.

In some embodiments, an access barrier 69 may logically divide memory 50 between unprotected memory space (to the right of the access barrier 69) and a protected memory space (to the left of the access barrier 69). Access control subsystem 53 functions to prevent applications and modules operating in the unprotected memory space from accessing applications and modules operating in the protected memory space as well as any hardware resources of highly-privileged resources 60 unless the access control subsystem 53 has been specially-configured to permit such access (e.g., frontend service 54 has been configured to be permitted to send requests 72 to backend service 66).

Memory 50 may include both a system memory portion for storing programs and data in active use by the processing circuitry 42 as well as a persistent storage portion (e.g., solid-state storage and/or disk-based storage) for storing programs and data even while the client computing device 32 is powered off. The OS 52 and the software modules (e.g., 54, 55, 56, 57, 58, 64 and parts of 60 and 62) are typically stored both in system memory and in persistent storage so that they may be loaded into system memory from persistent storage upon a system restart. Software modules 54, 55, 56, 57, 58, 64, when stored in non-transient form either in system memory or in persistent storage, form a computer program product. The processing circuitry 42 running one or more of these software modules 54, 55, 56, 57, 58, 64 thus forms a specialized circuit constructed and arranged to carry out the various processes described herein.

Figure 2:
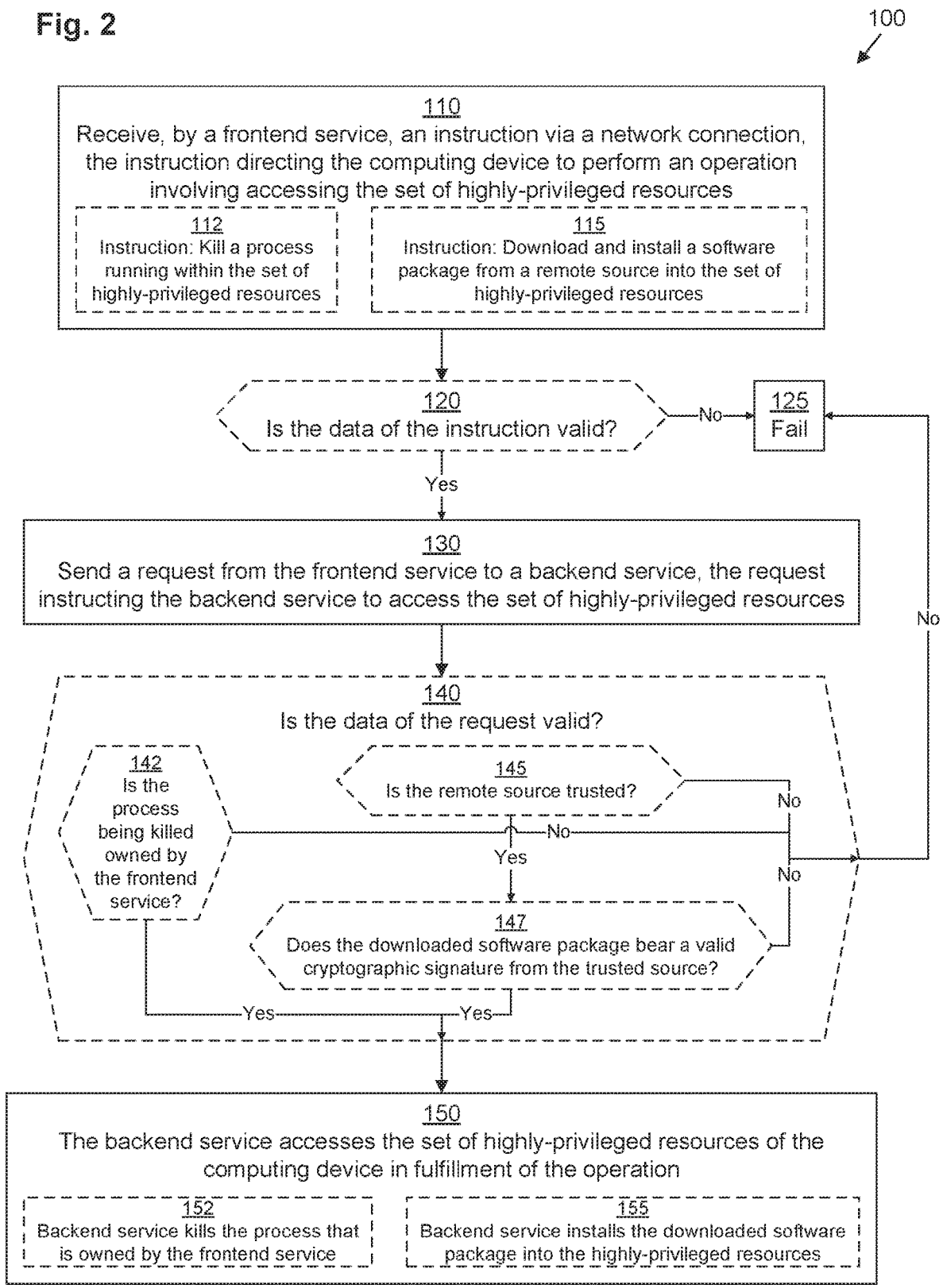
FIG. 2 depicts an example method according to various embodiments.

FIG. 2 depicts an example method 100 performed by a client computing device 32. It should be understood that any time a piece of software, such as, for example, OS 52, access control subsystem 53, frontend service 54, validation module 55, backend service 56, access control module 57, validation module 58, access control module 61, etc. is described as performing a method, process, step, or function, in actuality what is meant is that a computing device (e.g., client computing device 32) on which that piece of software is running performs the method, process, step, or function when executing that piece of software on its processing circuitry 42. It should also be understood that, in some embodiments, instead of processing circuitry 42 executing code of software, specialized circuitry of the client computing device 32 operates to perform the method, process, step, or function directly in hardware.

It should be understood that, within FIG. 2, steps 120, 140 are dashed because they may be considered optional and not fundamental to method 100. However, it should be understood that, in some embodiments, one or more of the other steps or sub-steps may also be omitted. Similarly, in some embodiments, one or more steps or sub-steps may be combined together or performed in a different order. In addition, sub-steps 112, 115, 142, 145, 147, 152, 155 are dashed because they may represent alternative embodiments or use cases, and thus may be omitted under certain conditions.

Method 100 may be performed, for example, in the context of a client user using computing device 32 to access remote services or resources served by cloud server 36. Client user interfaces with frontend service 54 in order to access the remote services or resources served by cloud server 36.

In step 110, frontend service 54 receives an instruction 70 via network interface circuitry 44 (the instruction 70 having traveled across network 34 from cloud server 36). The instruction 70 directs the computing device 32 to perform an operation that involves accessing the set of highly-privileged resources 60.

For example, in one case (sub-step 112), the instruction 70 is a kill command to kill a process 66 running within the highly-privileged resource 60 portion of memory 50.

In another example case (sub-step 115), the instruction 70 is a command instructing the computing device to download a software package 39 from trusted source 38 and to then install it as an installed software package 68 within the highly-privileged resource 60 (e.g., on a portion of a disk assigned to store applications installed by the client user).

In some embodiments, operation proceeds directly with step 130, while, in other embodiments, operation first proceeds with optional step 120. In optional step 120, validation module 55 of frontend service 54 checks whether data associated with the instruction 70 is valid. If the data is valid, operation proceeds with step 130. Otherwise, operation proceeds with step 125 in which method 100 fails to execute the instruction 70.

For example, in the context of a case in which sub-step 112 had been performed (i.e., the instruction 70 is a kill command), validation module 55 checks whether the process 66 is a process 66(a) owned by the frontend service 54 or a process 66(N) that is not owned by the frontend service 54. If the former, operation proceeds with step 130. If the latter, operation proceeds with step 125 in which method 100 fails to execute the instruction 70, since it is not proper to kill a process 66(N) that is unrelated to the cloud service.

As another example, in the context of a case in which sub-step 115 had been performed (i.e., the instruction 70 is a download/install command), validation module 55 checks whether the remote source is trusted. If not, validation fails and operation proceeds with step 125. Otherwise, frontend service 54 downloads the software package 39 from the trusted source 38. The, validation module 55 then checks whether the downloaded software package 39 has been properly signed by trusted source 38. If it has, then validation succeeds, and operation proceeds with step 130. Otherwise, validation fails and operation proceeds with step 125.

In step 130, frontend service sends a request 72 to the backend service 56 instructing the backend service 56 to perform the operation (see instruction 70) that involves accessing the set of highly-privileged resources 60. For example, in the context of a case in which sub-step 112 had been performed (i.e., the instruction is a kill command), request 72 is a request to kill the process 66. As another example, in the context of a case in which sub-step 115 had been performed (i.e., the instruction is a download/install command), request 72 is an install command requesting that the backend service 56 install the downloaded software package 39 into the highly-privileged resources 60.

It should be understood that, in some embodiments, access control subsystem 53 of OS 52 will prevent request 72 from reaching backend service 56 unless the request 72 came from the frontend service 54. In other embodiments, request 72 will reach backend service 56 regardless, but access control module 57 of backend service 56 will verify that the request 72 came from the frontend service 54 before permitting backend service 56 to service the request 72.

In some embodiments, operation proceeds directly with step 150, while, in other embodiments, operation first proceeds with optional step 140. In optional step 140, validation module 58 of backend service 56 checks whether data of the request 72 is valid. If the data is valid, operation proceeds with step 150. Otherwise, operation proceeds with step 125 in which method 100 fails to execute the request 72.

For example, in the context of a case in which sub-step 112 had been performed (i.e., the request 72 is a kill command), validation module 58 checks (sub-step 142) whether the process 66 is a process 66(a) owned by the frontend service 54 or a process 66(N) that is not owned by the frontend service 54. If the former, operation proceeds with step 150. If the latter, operation proceeds with step 125 in which method 100 fails to execute the request 72, since it is not proper to kill a process 66(N) that is unrelated to the cloud service.

As another example, in the context of a case in which sub-step 115 had been performed (i.e., the request 72 is an install command), validation module 58 checks (sub-step 145) whether the remote source is trusted. If not, validation fails and operation proceeds with step 125. Otherwise, validation module 58 then checks (sub-step 147) whether the downloaded software package 39 has been properly signed by trusted source 38. If it has, then validation succeeds, and operation proceeds with step 150. Otherwise, validation fails and operation proceeds with step 125.

It should be noted that, in some embodiments, both steps 120 and 140 may be performed in order to provide enhanced security by having two separate services 54, 56 validate the data. This makes it difficult for a hacker to compromise the highly-privileged resources 60, since the hacker would need to compromise both validation modules 55, 58 to succeed.

Finally, in step 150, backend service 56 accesses the highly-privileged resources 60 in fulfillment of the operation by sending an access operation 74 to the highly-privileged resources 60. For example, in the context of a case in which sub-step 112 had been performed (i.e., the request 72 is a kill command), backend service 56 (sub-step 152), kills the process 66(a) that is owned by the frontend service 54. As another example, in the context of a case in which sub-step 115 had been performed (i.e., the request 72 is an install command), backend service 56 (sub-step 155) installs the downloaded software package 39 as installed software package 68 within the highly-privileged resources 60 of client computing device 32.

It should be understood that, in some embodiments, access control subsystem 53 of OS 52 will prevent access operation 74 from reaching the highly-privileged resources 60 unless the request 72 came from the backend service 56. In other embodiments, access operation 74 will reach the highly-privileged resources 60 regardless, but access control module 61 of the highly-privileged resources 60 will verify that the access operation 74 came from the backend service 56 before permitting the highly-privileged resources 60 to service the access operation 74.

Thus, techniques have been described for configuring a client computing device 32 to be resistant to exposing its highly-privileged resources 60 to the client-side cloud computing service (e.g., the combination of frontend service 54 and backend service 56) in the event of malicious takeover, while still providing the client-side cloud computing service with access to those highly-privileged resources 60 when necessary. This may be accomplished by dividing the client-side cloud computing service into a frontend (network-facing) service 54 and a separate backend (highly-privileged resources 60 facing) service 56 to provide resistance to hacking. Even if a hacker is able to compromise the frontend service 54 over the network 34, the hacker will not be able to directly access the highly-privileged resources 60 unless he is also able to compromise the security of the backend service 56. Security can be further enhanced by having both the frontend service 54 and the backend service 56 separately check the validity (e.g., via validation modules 55, 58) of commands directed at the highly-privileged resources 60 and by utilizing access control mechanisms (e.g., access control subsystem 53 or access control modules 57, 61) to prevent unauthorized access to the highly-privileged resources 60.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transient computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method of performing operations involving accessing a set of protected computing resources of a client computing device, the method comprising:
   receiving, by a frontend service running on the client computing device, an instruction from a remote application running on a remote cloud server via a network connection, the instruction directing the client computing device to perform an operation involving accessing the set of protected resources of the client computing device, the set of protected computing resources being configured to refuse access to the frontend service;
   in response to receiving the instruction from the remote application, sending a request from the frontend service running on the client computing device to a backend service running on the client computing device, the request instructing the backend service to access the set of protected resources of the client computing device, the backend service being configured to not communicate via the network connection, the set of protected computing resources being configured to permit access to the backend service;
   in response to the backend service receiving the request from the frontend service, the backend service accessing the set of protected resources of the client computing device in fulfillment of the operation; and
   the frontend service providing a client user of the client computing device with access to the remote application running on the remote cloud server across the network connection.

2. The method of claim 1 wherein the client computing device is configured with an access control mechanism, the access control mechanism being configured to:
   permit the backend service to receive requests only from the frontend service; and
   permit the set of protected resources of the client computing device to be accessed only by the backend service.

3. The method of claim 1 wherein:
   the backend service is configured to refuse any received request unless it is from the frontend service; and
   the set of protected resources of the client computing device are configured to refuse access except to the backend service.

4. The method of claim 1 wherein:
   the method further comprises the backend service checking data of the request for validity; and
   the backend service accesses the set of protected resources of the client computing device in fulfillment of the operation only in response to the backend service validating the request.

5. The method of claim 4 wherein:

the instruction directs the client computing device to download a software package from a remote source and to install the software package on the set of protected resources of the client computing device;

the request instructs the backend service to install the software package on the set of protected resources of the client computing device, the software package having been downloaded from the remote source by the frontend service, the software package bearing a cryptographic signature; and the backend service checking data of the request for validity includes:
verifying that the remote source is a trusted source; and
verifying that the downloaded software package bears a valid cryptographic signature from the trusted source.

6. The method of claim 4 wherein:
the instruction directs the client computing device to kill a process within the set of protected resources of the client computing device;
the request instructs the backend service to kill the process within the set of protected resources of the client computing device; and
the backend service checking data of the request for validity includes verifying that the process is owned by the frontend service.

7. The method of claim 4 wherein:
the method further comprises the frontend service checking data of the instruction for validity; and
sending the request from the frontend service to the backend service is performed in response to the frontend service validating the data of the instruction.

8. The method of claim 6 wherein the process executes within a kernel of the client computing device.

9. The method of claim 1 wherein the method further comprises:
a compromised application running on the client computing device sending another request to the backend service instructing the backend service to access the set of protected resources of the client computing device; and
in response to the backend service receiving the other request from the compromised application, the backend service refraining from accessing the set of protected resources in fulfillment of the other request.

10. A client apparatus comprising:
network interface circuitry configured to communicate with a network;
a set of protected resources; and
memory coupled to processing circuitry configured to:
receive, by a frontend service running on the processing circuitry, an instruction from a remote application running on a remote cloud server via the network interface circuitry, the instruction directing the client apparatus to perform an operation involving accessing the set of protected resources, the set of protected computing resources being configured to refuse access to the frontend service;
in response to the frontend service receiving the instruction from the remote application, send a request from the frontend service to a backend service running on the processing circuitry, the request instructing the backend service to access the set of protected resources, the backend service being configured to not communicate with the network interface circuitry, the set of protected computing resources being configured to permit access to the backend service;
in response to the backend service receiving the request from the frontend service, access, by the backend service, the set of protected resources in fulfillment of the operation; and
provide, by the frontend service, a client user of the client apparatus with access to the remote application running on the remote cloud server across the network interface circuitry.

11. The client apparatus of claim 10 wherein the memory coupled to processing circuitry is further configured to execute an access control mechanism, the access control mechanism being arranged to:
permit the backend service to receive requests only from the frontend service; and
permit the set of protected resources to be accessed only by the backend service.

12. The client apparatus of claim 10 wherein:
the backend service is arranged to refuse any received request unless it is from the frontend service; and
the set of protected resources are arranged to refuse access except to the backend service.

13. The client apparatus of claim 10 wherein:
the memory coupled to processing circuitry is further configured to execute the backend service to check data of the request for validity; and
the backend service accesses the set of protected resources in fulfillment of the operation only in response to the backend service validating the request.

14. The client apparatus of claim 13 wherein:
the memory coupled to processing circuitry is further configured to execute the frontend service to check data of the instruction for validity; and
sending the request from the frontend service to the backend service is performed in response to the frontend service validating the data of the instruction.

15. A computer program product comprising a non-transitory computer-readable storage medium storing a set of instructions, which, when executed by a client computing device, cause the client computing device to access a set of protected computing resources of the client computing device by:
receiving, by a frontend service running on the client computing device, an instruction from a remote application running on a remote cloud server via a network connection, the instruction directing the client computing device to perform an operation involving accessing the set of protected resources of the client computing device, the set of protected computing resources being configured to refuse access to the frontend service;
in response to receiving the instruction from the remote application, sending a request from the frontend service running on the client computing device to a backend service running on the client computing device, the request instructing the backend service to access the set of protected resources of the client computing device, the backend service being configured to not communicate via the network connection, the set of protected computing resources being configured to permit access to the backend service;
in response to the backend service receiving the request from the frontend service, the backend service accessing the set of protected resources of the client computing device in fulfillment of the operation; and the frontend service providing a client user of the client computing device with access to the remote application running on the remote cloud server across the network connection.

16. The computer program product of claim 15 wherein the client computing device is configured with an access control mechanism, the access control mechanism being configured to:
   permit the backend service to receive requests only from the frontend service; and
   permit the set of protected resources of the client computing device to be accessed only by the backend service.

17. The computer program product of claim 15 wherein:
   the backend service is configured to refuse any received request unless it is from the frontend service; and
   the set of protected resources of the client computing device are configured to refuse access except to the backend service.

18. The computer program product of claim 15 wherein:
   the set of instructions, when executed by the client computing device, further cause the client computing device to execute the backend service to check data of the request for validity; and
   the backend service accesses the set of protected resources of the client computing device in fulfillment of the operation only in response to the backend service validating the request.

19. The computer program product of claim 18 wherein:
   the set of instructions, when executed by the client computing device, further cause the client computing device to execute the frontend service to check data of the instruction for validity; and
   sending the request from the frontend service to the backend service is performed in response to the frontend service validating the data of the instruction.

* * * * *